United States Patent
Leman

(10) Patent No.: US 11,368,121 B2
(45) Date of Patent: Jun. 21, 2022

(54) METHODS AND SYSTEMS FOR MOTOR DIAGNOSIS

(71) Applicant: Melexis Bulgaria Ltd., Sofia (BG)

(72) Inventor: Dirk Leman, Tessenderlo (BE)

(73) Assignee: MELEXIS BULGARIA LTD, Sofia (BG)

( * ) Notice: Subject to any disclaimer, the term of this patent is extended or adjusted under 35 U.S.C. 154(b) by 8 days.

(21) Appl. No.: 16/985,731

(22) Filed: Aug. 5, 2020

(65) Prior Publication Data

US 2021/0044246 A1 Feb. 11, 2021

(30) Foreign Application Priority Data

Aug. 5, 2019 (BG) ........................................ 112978

(51) Int. Cl.
*H02P 29/028* (2016.01)
*H02P 6/28* (2016.01)
*H02P 6/20* (2016.01)

(52) U.S. Cl.
CPC .............. *H02P 29/028* (2013.01); *H02P 6/20* (2013.01); *H02P 6/28* (2016.02)

(58) Field of Classification Search
CPC .. H02P 29/028; H02P 6/28; H02P 6/20; H02P 6/17; H02P 6/08
USPC ........................ 318/490, 400.01, 400.42, 700
See application file for complete search history.

(56) References Cited

U.S. PATENT DOCUMENTS

| | | | |
|---|---|---|---|
| 5,631,629 A | 5/1997 | Fooks et al. | |
| 6,392,372 B1 | 5/2002 | Mays, II | |
| 8,018,189 B2* | 9/2011 | Narumi | H02P 6/18 361/240 |
| 9,825,577 B2* | 11/2017 | Ishikawa | H02P 29/027 |
| 9,917,539 B1* | 3/2018 | Omura | H02P 6/16 |
| 2018/0287523 A1 | 10/2018 | Leman et al. | |

OTHER PUBLICATIONS

Search Report from corresponding EP Application No. EP 19190292, dated Jan. 27, 2020.

* cited by examiner

*Primary Examiner* — David Luo
(74) *Attorney, Agent, or Firm* — Workman Nydegger

(57) ABSTRACT

A Brushless Direct Current (BLDC) motor controller comprises a first terminal for applying a first voltage and a second terminal for applying a second voltage to obtain a driving current for driving a BLDC motor. The BLDC motor controller comprises a remote control unit which is adapted for monitoring a signal which is indicative for a current through at least the first or the second terminal. The BLDC motor controller is adapted for increasing the monitored current by applying an additional current. The additional current is different from zero if the motor is rotating. The BLDC motor controller is adapted for determining whether the motor is rotating or not, based on the monitored signal.

14 Claims, 5 Drawing Sheets

METHODS AND SYSTEMS FOR MOTOR DIAGNOSIS

FIELD OF THE INVENTION

The invention relates to the field of Brushless Direct Current (BLDC) motors. More specifically it relates to methods and systems for controlling BLDC motors.

BACKGROUND OF THE INVENTION

BLDC motors may be used in a wide range of applications. Depending on the application, the power requirements of the BLDC motors differ. For example, in automotive light emitting diode (LED) headlamps, legacy electronic control units (ECU's) have been developed using first generation fans, to cover a wide range of fan powers.

In automotive applications the size and weight of the BLDC motors is preferably minimized in order to reduce the overall weight of the vehicle. For example, in case of BLDC motors for fans, the system complexity, the fan size (larger connector), and the overall car weight (number of wires in the wiring harness, connector sizes), is decreased by using 2-wire fans, in which the state of the fan is diagnosed over a shunt in the supply line under use of diagnostic thresholds.

In more recent generation LED headlamps, the LEDs have become more efficient, requiring less cooling, as well as the fans have become more efficient. For instance, it is well known by the person skilled in the art that sleeve bearings have lower noise, and higher efficiency than ball bearings. While ball bearings, offer a longer life time especially for high temperature applications, and applications exposed to significant amounts of dust, and are therefore more often used in applications with long life time and high temperature requirements. As a consequence, the new generation fans are not able to comply with the diagnostics thresholds on the shunt in the supply line in the legacy ECUs's.

Prior solutions used more powerful and/or less efficient motors (e.g. in fans), which is not compliant to the demand of improved car efficiency. The application of 3-wire or 4-wire motors allows to use the digital RD and FG signals, however this increases overall car weight, and motor size, in particular the motor size is preferred to be as small as possible.

There is therefore a need for diagnostic systems and methods for determining whether a BLDC motor is rotating. Preferably the size and weight of a motor comprising such a diagnostic system is reduced as much as possible.

SUMMARY OF THE INVENTION

It is an object of embodiments of the present invention to provide good diagnostic systems and methods for determining whether a BLDC motor is rotating or not.

The above objective is accomplished by a method and device according to the present invention.

In a first aspect embodiments of the present invention relate to a BLDC motor controller for controlling a BLDC motor. The BLDC motor controller comprises a first and a second terminal for applying a first voltage on the first terminal and a second voltage on the second terminal to obtain a driving current for driving the BLDC motor wherein the first voltage is higher than the second voltage, The BLDC motor controller comprises a remote control unit which is adapted for monitoring a signal which is indicative for a current through at least the first or the second terminal.

The BLDC motor controller, moreover, is adapted for increasing the monitored current by applying an additional current wherein the additional current is different from zero if the motor is rotating.

The BLDC motor controller, moreover, is adapted for determining whether the motor is rotating or not based on the monitored signal.

In embodiments of the present invention the additional current is smaller when the motor is not rotating than when the motor is rotating. In embodiments of the present invention the additional current may even be zero if the motor is not rotating.

The second terminal of the BLDC motor may be connected to ground.

It is an advantage of embodiments of the present invention that the difference between the signal when the motor is rotating and the signal when the motor is not rotating is increased compared to BLDC motor controllers which are not adapted for increasing the additional current during rotation. Hence, a remote controller can more easily discriminate when a motor is rotating or not based on the monitored signal.

This may for example be achieved by comparing the monitored signal with a first threshold above which it is assumed that the motor is rotating. A second threshold may be used below which it is assumed that the motor is not rotating. This second threshold may for example be smaller than the first threshold.

In embodiments of the present invention the motor may be a 1, 2 or 3-phase motor.

In embodiments of the present invention the additional current is not driving the BLDC motor.

In embodiments of the present invention the BLDC motor controller comprises a current module which is adapted for applying the additional current using an output pin of the BLDC motor of which an output signal is indicative for a motion state of the motor wherein the motion state indicates whether the motor is rotating or not.

It is an advantage of embodiments of the present invention that an existing output pin of the motor can be used for generating the additional signal to increase the current difference between a rotating and non-rotating motor.

In embodiments of the present invention the current module comprises at least one pull up resistor connected between the first terminal and the output pin which is adapted for generating a frequency generator signal or a motor ready signal.

It is an advantage of embodiments of the present invention that a pull up resistor is sufficient to increase the current difference of the current through the first or second terminal between a rotating and non-rotating motor.

In embodiments of the present invention the current module comprises at least one transistor of which the gate is adapted to be connected to the output pin, which is adapted for generating a frequency generator signal or a motor ready signal, and wherein a source/drain current path of the transistor is connected between the first terminal and the second terminal. This configuration is for a field effect transistor (FET). In embodiments of the present invention the transistor may be a bipolar transistor or a field effect transistor. In case of a bipolar transistor the base is adapted to be connected to the output pin, which is adapted for generating a frequency generator signal or a motor ready signal, and wherein an emitter/collector current path is connected between the first terminal and the second terminal.

In embodiments of the present invention the BLDC motor controller comprises a current module adapted for monitoring the driving current and for applying the additional current in function of the driving current such that with an increased driving current an increased additional current is applied.

In embodiments of the present invention the motor controller is moreover adapted for modulating the monitored current to embed additional information in the monitored current.

It is an advantage of embodiments of the present invention that additional information can be embedded in the monitored current by modulating the monitored current. For example, temperature information may be embedded in the monitored current.

In embodiments of the present invention the BLDC motor controller comprises a switch adapted for disconnecting the current module.

It is an advantage of embodiments of the present invention that, depending on the motor load, the current module can be disconnected or not. If the additional current is required to cross a threshold (e.g. the high threshold), the current module is connected such that the monitored current is the sum of drive current and the additional current. If the additional current is not required to cross a threshold (e.g. the high threshold), the current module may be disconnected such that the monitored current only comprises the drive current.

In a second aspect embodiments of the present invention relate to a motor system. The motor system comprises a BLDC motor controller according to embodiments of the present invention and a BLDC motor.

In embodiments of the present invention the BLDC motor comprises an output pin connected with the current module. The output pin is adapted to generate an output signal which is indicative for a motion state of the motor. The motion state indicates whether the motor is rotating or not.

In embodiments of the present invention the BLDC motor is adapted for generating a motor ready signal on the output pin.

In embodiments of the present invention the BLDC motor is adapted for starting the ready signal during a driven period with an initial state which indicates a rotating motor.

If after a predefined time period no polarity changes are detected the state of the ready signal may change to a state indicating a non-rotating motor.

In other embodiments of the present invention the BLDC motor is adapted for starting the ready signal during a driven period with an initial state which indicates a non-rotating motor.

After a predefined number of polarity changes are detected, the state of the ready signal may change to a state indicating a rotating motor.

In embodiments of the present invention the BLDC motor is adapted for generating a frequency generator signal on the output pin.

In embodiments of the present invention the BLDC motor may be adapted for starting the frequency generator signal with a level which is the same as when the BLDC motor is not rotating.

In a third aspect embodiments of the present invention relate to a method for controlling a BLDC motor. The method comprises:

applying a first voltage on a first terminal and a second voltage on a second terminal to obtain a driving current for driving the BLDC motor wherein the first voltage is higher than the second voltage, monitoring a signal which is indicative for a current through at least the first or the second terminal, increasing the monitored current by applying an additional current, determining whether the motor is rotating or not based on the monitored signal.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
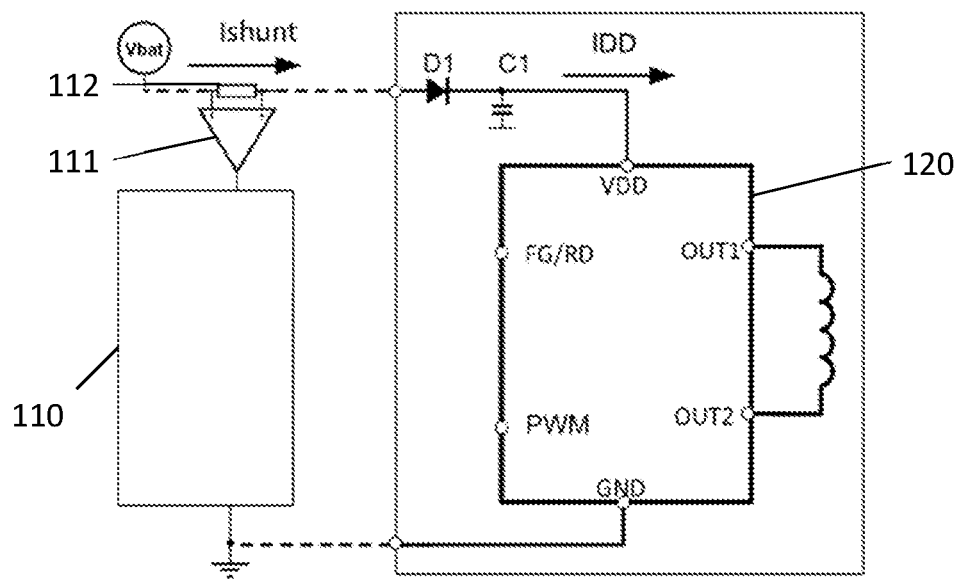
FIG. 1 shows a schematic drawing of a prior art 2-wire motor, diagnosed using a shunt in the supply line.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As explained in the introduction the state of a motor may be diagnosed by measuring the current using a shunt in the supply line under use of diagnostic thresholds. FIG. 1 shows a schematic drawing of a 2-wire motor 120, diagnosed using a shunt 112 in the supply line. An amplifier 111 is connected to amplify the voltage over the shunt. In the example the amplified voltage is used as input signal of a remote motor control unit 110.

Figure 2:
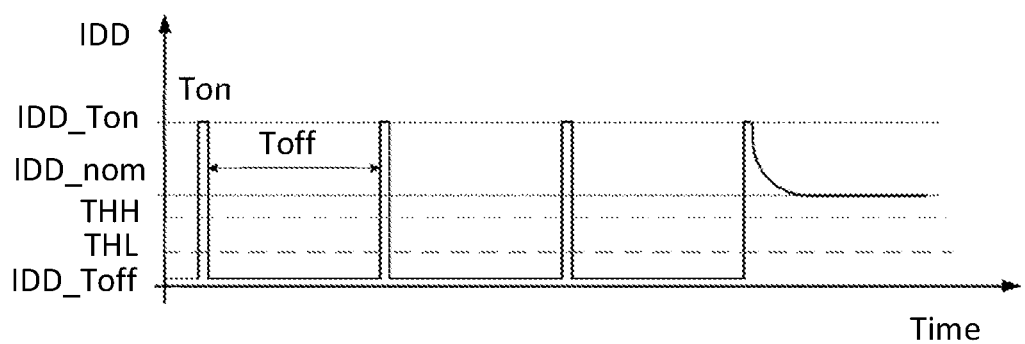
FIG. 2 shows a 2-wire diagnostics signal measured over the shunt resistor in the supply line of the motor of FIG. 1.

FIG. 2 shows a 2-wire diagnostics signal measured over the shunt resistor in the supply line of a motor, in case the motor is locked and in case the motor is rotating. A measure of the current through the supply line is shown in function of time. During the period Ton the motor is driven and tries to start. After Ton, the driver is not driving during a period Toff, before retrying to start.

While the motor controller is trying to start, an increased current consumption IDD of the motor (up to IDD_Ton), is increasing the voltage drop over the shunt. When the motor is not rotating during the Toff period, the current may be as low as IDD_Toff, which may for example be below 5 mA. When the motor is motor is rotating the current may be equal to the nominal current IDD_nom. Determining whether the motor is rotating may be done using a high threshold THH (a first threshold) and determining whether the motor is not rotating may be done using a low threshold THL. In legacy 2-wire motors (e.g. for fans), the low threshold THL (a second threshold) may for example range between 10 and 20 mA (for example 10 mA, 12 mA or 14 mA), and the high threshold THH may for example range between 50 and 80 mA (for example 50 mA or 60 mA or 70 mA). A current over the shunt below the low threshold indicates the motor is not drawing current, and therefore stopped. Current over the shunt above the high threshold indicates the motor is spinning.

FIG. 2 shows three failing start up attempts.

Figure 3:
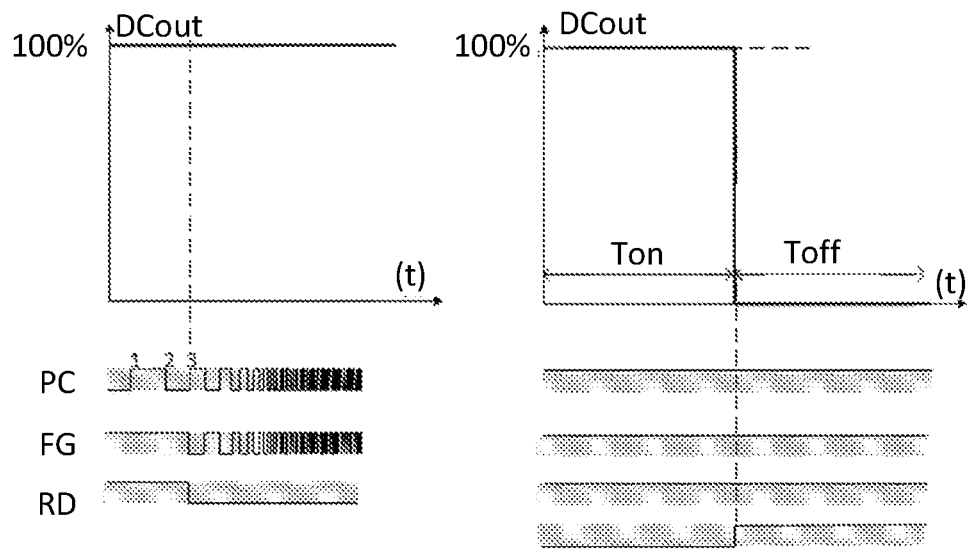
FIG. 3 shows 3-wire and 4-wire motor digital diagnostics signals (RD and FG).

FIG. 3 shows 3-wire and 4-wire motor digital diagnostics signals (RD and FG), for a motor starting up normal (left graph), and in case the motor is blocked during start up (right graph). For the graph of FIG. 3 the fan was started by applying a 100% duty cycle voltage DCout.

The FG (Frequency Generator) signal, also referred to as tacho signal, starts to toggle according to the polarity changes PC detected by a sensing element in the motor, for instance a magnetic hall sensor, after 3 initial polarity changes. The FG signal offers a high degree of information also during fan rotation, since it reflects the actual rotational speed of the motor.

Two implementations of the RD (motor ReaDy or Rotation Detect) signal are shown. In a first implementation, the RD signal is high as long as the motor control isn't sure, if the motor is turning (RD_init High). In this case the RD signal is initialized high, and goes low only after three polarity changes have been detected.

In a second implementation, the RD signal only goes high when the motor controller detects, if the motor is not rotating. A timeout timing Ton is predefined after which the RD signal will go high after a start up attempt.

A wide range of motor drivers are realized using either FG or RD outputs. The goal is to allow remote control units to analyze a digital signal to evaluate the state of the motor.

However, these motor drivers require additional wiring and analysis of the FG/RD signal. It is an advantage of embodiments of the present invention that this additional wiring is not required.

In a first aspect embodiments of the present invention relate to a BLDC motor controller 100 for controlling a BLDC motor 120.

The BLDC motor controller 100 comprises a first 113 and a second terminal 114 for applying a first voltage on the first terminal 113 and a second voltage on the second terminal 114 to obtain a driving current for driving the BLDC motor.

In embodiments of the present invention the first voltage may be higher than the second voltage.

In embodiments of the present invention the BLDC motor controller 100 comprises a remote control unit 110 which is adapted for monitoring a signal which is indicative for a current through at least the first 113 or the second terminal 114.

The BLDC motor controller 100 is adapted for increasing the monitored current by applying an additional current which is not driving the BLDC motor 120.

The BLDC motor controller 100 is adapted for determining whether the motor is rotating or not based on the monitored signal.

The additional current which is not driving the BLDC motor is a current that does not produce torque in the motor. As opposed to the current producing torque in the motor, this additional current does not go through the coil. Besides the additional current there may be an operational current of the driver IC which is not driving the motor which also does not go through the coil.

The additional current may thereby be different from zero if the motor is rotating. In embodiments of the present invention the additional current may be smaller when the motor is not rotating than when the motor is rotating.

The BLDC motor may for example be used for driving a fan or a pump. The invention is, however, not limited thereto.

The BLDC motor 120 may comprise one or more coils. It may, moreover, comprise a driver for driving a current through the coils. The one or more coils may be assembled together with the driver in one piece with pins on the outside.

In embodiments of the present invention the BLDC motor controller 100 comprises a current module 115 which is adapted for applying the additional current using an output pin 121 of the BLDC motor 120 of which an output signal is indicative for a motion state of the motor 120. The motion state thereby indicates whether the motor is rotating or not.

In a second aspect embodiments of the present invention relate to a motor system 200. The motor system 200 comprises a BLDC motor controller 100 according to embodiments of the present invention and comprises a BLDC motor 120.

In embodiments of the present invention existing RD functionality or FG functionality in standard BLDC motors (e.g. fandrivers) may be used to increase the current consumption of the motor. It is advantageous that this allows to scale down the motor size, without affecting the acoustic noise or vibration in the motor.

Figure 4:
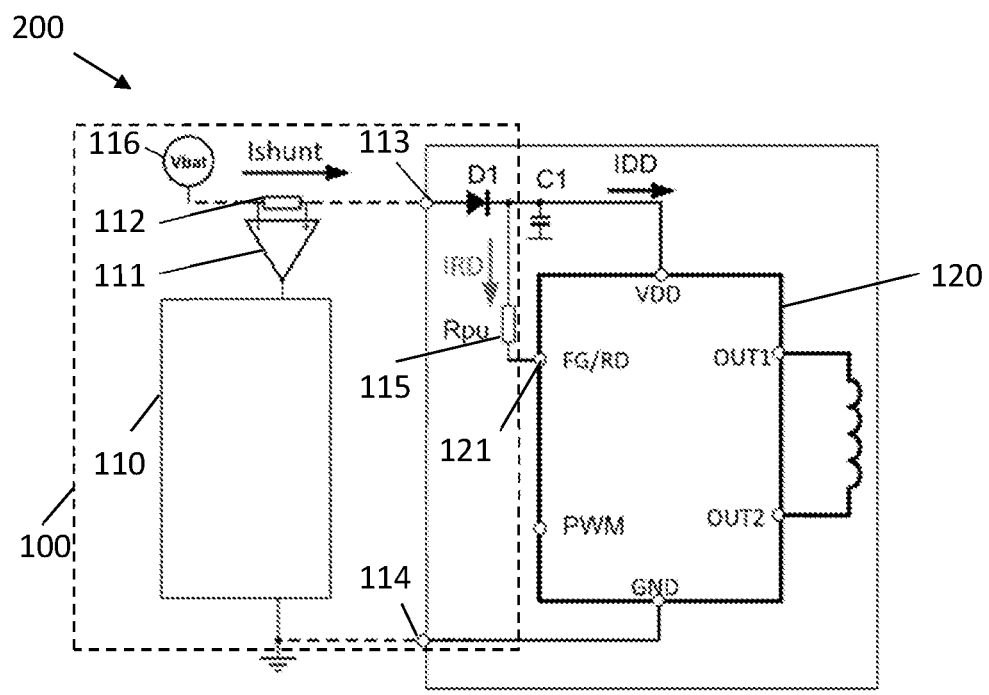
FIG. 4 shows a schematic drawing of a BLDC motor controller and of a motor system in accordance with embodiments of the present invention.

FIG. 4 shows a schematic drawing of a BLDC motor controller 100 and of a motor system 200 in accordance with embodiments of the present invention. The motor 120 of FIG. 4 is diagnosed using a shunt in the supply line. Using the shunt 112 and the amplifier 111 a signal is obtained which is indicative for the current through the terminal 113. The signal is, moreover, amplified (increased current) in accordance with embodiments of the present invention. The BLDC motor controller 100 of FIG. 4, therefore, comprises a current module 115 which draws an additional current IRD, as soon as the BLDC motor controller 100 has detected the rotation of the motor, on top of the operational motor current (IDD). In the example of FIG. 4 this current module 115 is a pull up resistor. The current module 115 is connected between the first terminal 113 and the output pin 121.

A diode D1 may be present in the supply line. This diode D1 may be present between the shunt 112 and the BLDC motor 120 with its anode connected with the power supply and its cathode connected with the BLDC motor 120. The current module 115 may be connected to the supply line to a connection point between the diode D1 and the power supply 116 of the BLDC motor 120. The invention is, however, not limited thereto and other connection points on the supply line are also possible as long as this results in an additional current which increases the monitored current if the motor is rotating. The power supply 116 in FIG. 4 is indicated as Vbat. The invention is, however, not limited to a battery power supply. Any other suitable power supply may be used.

In the exemplary embodiment of FIG. 4 the output pin 121 is adapted for generating an FG signal or an RD signal.

In motor systems 200 according to embodiments of the present invention the BLDC motor may be adapted for generating the RD signal with the same condition as when the BLDC motor 120 is not rotating. The RD signal may be high or low. In the exemplary embodiment of FIG. 4 a high RD signal will not result in an additional current. This corresponds with a not moving motion state. If the ready signal is started with the same condition as when the motor is not rotating this means that, when starting, its level is the same as the level of the not moving motion state. Using an RD signal which is initially high, this ensures that the additional current is only drawn when the motor is sure to run. In that case there will be no intermediate state during which extra current is drawn during Ton while the motor is actually locked. This allows for a more simple implementation. In the exemplary embodiment of FIG. 4 a low RD signal will result in an additional current.

In embodiments of the present invention the RD signal may be implemented such that after motor start up the RD only goes low after 1 or more commutations have been detected, in case between 1 or 11 commutations have been detected, e.g. in case 3 commutations have been detected. In that case the BLDC motor controller has a time out window. In that time out window, the current is not monitored. The advantage is, that existing integrated circuits with existing RD functionality (wherein 3 motor commutations must be done) can be used as is.

In alternative embodiments of the present invention the RD signal may be implemented such that the motor starts with RD being low. It will only go high if the BLDC motor has detected, that it is not rotating. In embodiments of the present invention the BLDC motor may comprise a motor driver in which this time out functionality is implemented. Using an RD signal which is initially low, this will result in an additional current during Ton. If the drawn current is higher than the threshold, this could be considered as a "heart beat" signal to show the remote control unit that the motor is still connected. The may be used for diagnosing a broking wire, for more intelligent BLDC motor controller implementations, in accordance with embodiments of the present invention.

Figure 5:
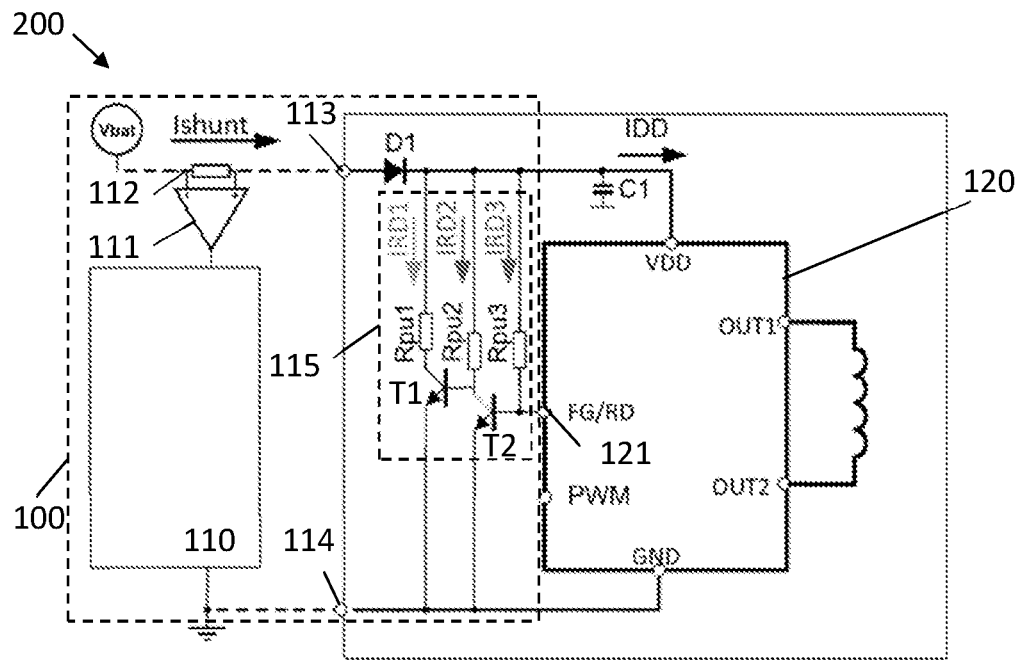
FIG. 5 shows a schematic drawing of a BLDC motor controller and of a motor system in accordance with embodiments of the present invention wherein the additional current is generated using transistors to achieve the required current level.

In embodiments of the present invention the current module 115 may comprise at least one transistor (Rpu1, Rpu2, Rpu3) of which the base (in case of a bipolar transistor) or gate (in case of a FET) is connected to the output pin 121 of the BLDC motor 120, and wherein an emitter/collector current path (in case of a bipolar transistor) or a source/drain current path (in case of a FET), is connected between the first terminal 113 and the second terminal 114 (see for example FIG. 5).

The output pin may for example be adapted for generating a frequency generator signal or a motor ready signal. The BLDC motor may therefore comprise a BLDC motor driver. In the embodiments illustrated in FIG. 4 and FIG. 5 the FG signal will result in an alternating additional current when the motor is rotating, the RD signal will result in a constant additional current when the motor is rotating. The alternating additional current may be integrated on a capacitor.

It is an advantage of embodiments of the present invention that if the current capability of the motor controller is insufficient to cross a high threshold level, external transistors can be added to increase the current level to the required current level.

An example of such an embodiment of the present invention is schematically illustrated in FIG. 5. FIG. 5 shows a schematic drawing of a 2-wire motor, diagnosed using a shunt 112 in the supply line, with amplified signal (increased current) according to embodiments of the present invention. The additional current is generated using transistors T1, T2, and pull up resistors Rpu1, Rpu3, Rpu3 of a current module 115 to achieve the required current level. The base (for a bipolar transistor) or gate (for a FET) of the transistors may be controlled using the output pin 121 which is adapted for generating an RD signal. For example, a standard available motor driver IC may be used on which the RD_init_high functionality is implemented.

In embodiments of the present invention the BLDC motor controller 100 comprises a current module 115 adapted for monitoring the driving current and for applying the additional current in function of the driving current such that with an increased driving current an increased additional current is applied. Such a current module 115 can be implemented without requiring the output pin 121. However, such implementations have the disadvantage of reduced efficiency, and increased complexity and cost due to the addition of a high power shunt resistor in the supply path of the motor which is carrying the drive current. Moreover, this solution is adding less current at low voltage, when the biggest boost in current is needed, and provides the highest boost when the current is already highest, so drawing extra, and thus wasted, current load onto the supply in worst case.

Figure 6:
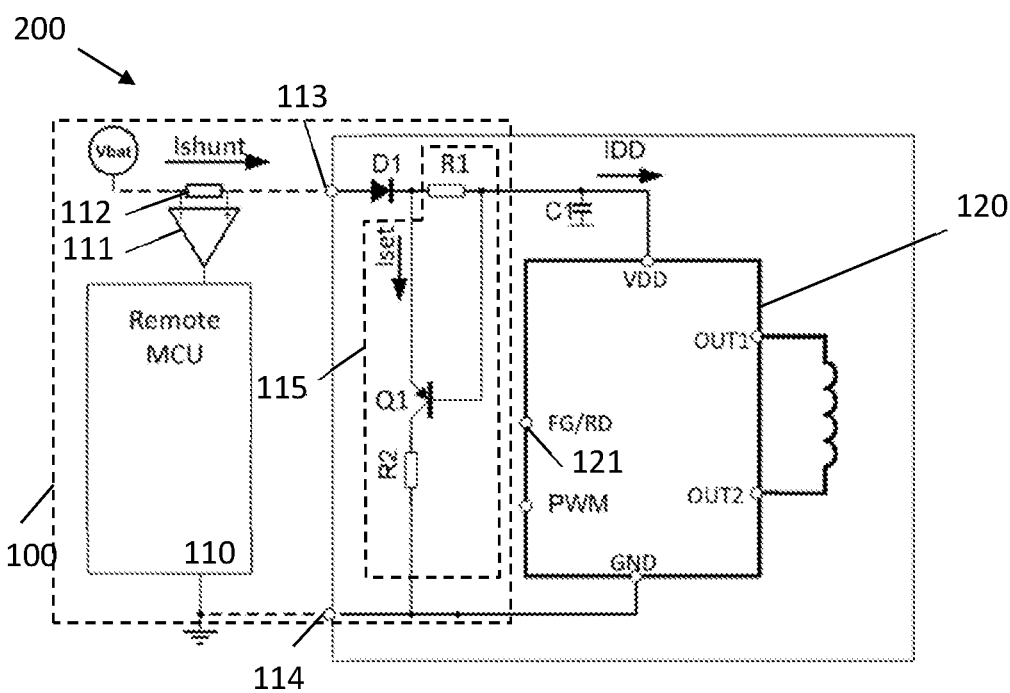
FIG. 6 shows a schematic drawing of a BLDC motor controller and of a motor system in accordance with embodiments of the present invention wherein the current module does not require an output pin of the BLDC motor.

An example of such an embodiment of the present invention is illustrated in FIG. 6. FIG. 6 shows a 2-wire motor, diagnosed using a shunt 112 in the supply line. The current module 115 comprises a transistor Q1, a resistor R1 and a resistor R2. The resistor R1 is a high power shunt resistor in the supply path of the motor through which the drive current IDD is flowing. The base of the bipolar junction transistor Q1 is connected between the resistor R1 and the power supply of the motor 120 and the emitter of the bipolar junction transistor Q1 is connected between the diode D1 and the resistor R1. The collector of the bipolar junction transistor is connected with the resistor R2. Thus, an emitter collector path is formed between the first terminal 113 and the second terminal 114. This implementation of a BLDC motor controller in accordance with embodiments of the present invention allows to apply an additional current when the motor is rotating which is higher than the additional current when the motor is not rotating without the need for the output pin 121.

It might be understood for the skilled person in the art, that different transistors might be used as for instance npn or pnp bipolar transistors or field effect transistors as for instance n-channel or p-channel transistors.

It is obvious, that FG/RD information might be of non-inverting or inverting nature. Thus Rpu might be related to the supply line or the ground line. The current measurement in the shunt 112 might also be in the supply line or in the ground line. These are just embodiments of the disclosed invention and are not limiting the scope. In embodiments of the present invention the BLDC motor controller 100 comprises a current module 115 adapted for monitoring the driving current and for applying the additional current in function of the driving current such that with an increased driving current an increased additional current is applied.

Figure 7:
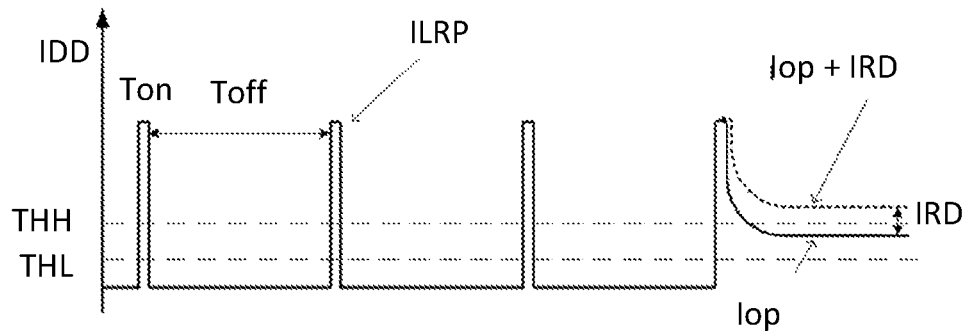
FIG. 7 shows the monitored current flowing through the shunt resistor for a 2-wire fan diagnosed using the shunt resistor in the supply line, in accordance with embodiments of the present invention.

FIG. 7 shows the monitored current IDD flowing through the shunt resistor 112 for a 2-wire fan diagnosed using the shunt resistor 112 in the supply line. As can be seen from this graph the monitored current, when the motor is rotating, is the sum of the driving current Iop and the additional current IRD.

The current drawn by the motor during failing attempts is referred to as ILRP.

This BLDC motor controller 100 may be adapted for comparing the monitored signal with a first threshold THH above which it is assumed that the motor is rotating. A second threshold THL may be used by the BLDC motor controller 100 below which it is assumed that the motor is not rotating. This second threshold THL may for example be smaller than the first threshold THH.

It is an advantage of embodiments of the present invention that for motors which in their most efficient design, and lowest current consumption operating point (typically highest ambient temperature) do not draw sufficient current to remain above the high threshold during normal operation (IDD=Iop), the additional drawn current IRD, allows to ensure diagnostics. It is, moreover, advantageous that BLDC motor controllers according to embodiments of the present invention can be used with any legacy system on the market.

In embodiments of the present invention the motor controller 100 may, moreover, be adapted for modulating the monitored current to embed additional information in the monitored current. For instance, in case the motor stops rotating, the motor controller may encode the root cause for the stopping of the motor into the current. In this case the diagnostics current must be higher than the existing thresholds, if legacy systems are being used.

Figure 8:
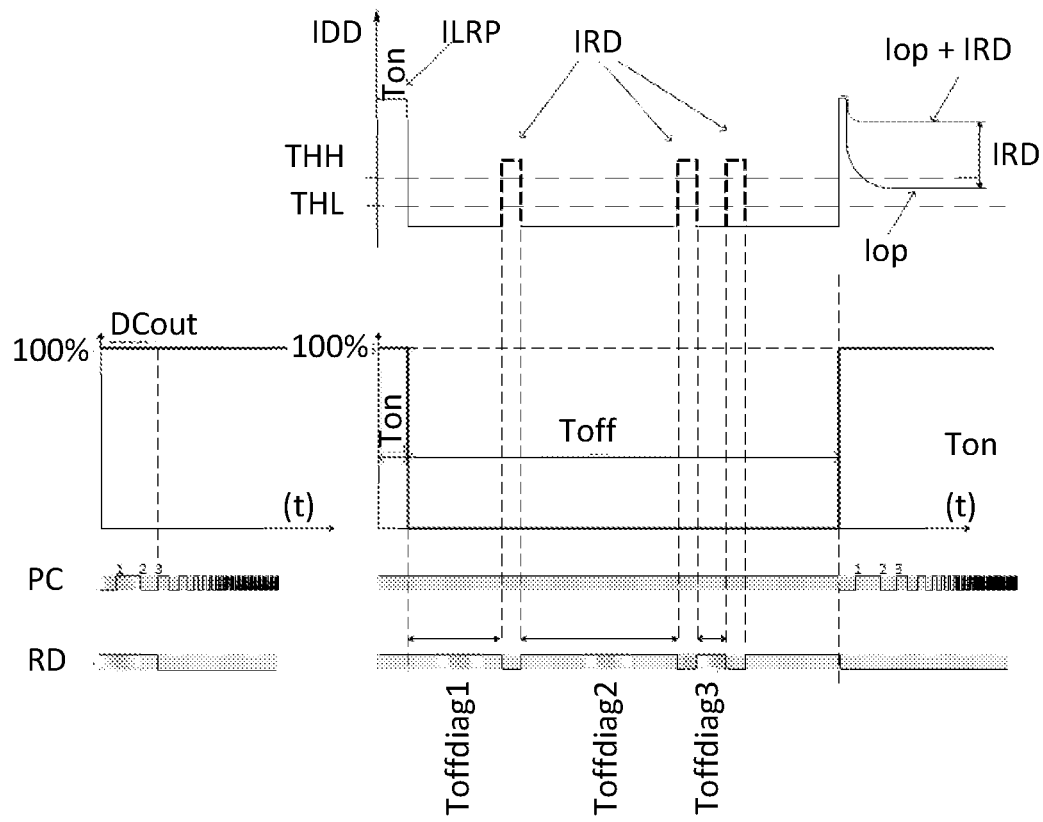
FIG. 8 shows the monitored current and the applied voltage in function of time with failure diagnostics information encoded in the monitored current during the Toff time for locked rotor protection.
Figure 9:
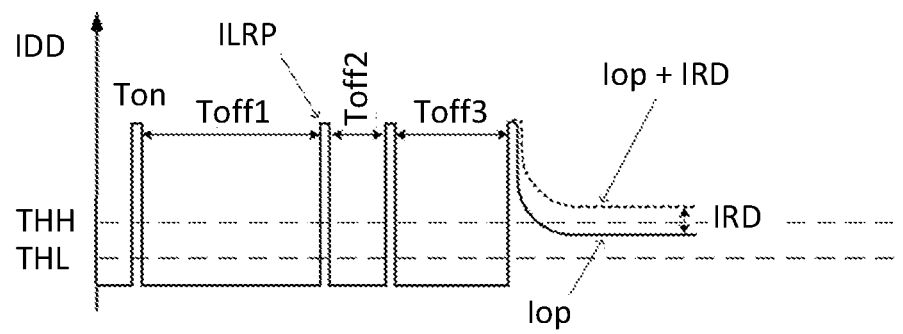
FIG. 9 shows the monitored current in function of time wherein additional information is encoded in the monitored signal.

FIG. 8 shows an example implementation to encode failure diagnostics information during the Toff time for locked rotor protection (LRP). In LRP a pulse width modulated driving signal may for example be applied with an output duty cycle DCout=100%, until a hall sensor has toggled at least one time. If the hall sensor does not toggle within a time Ton, the fandriver enters LRP. After a time Toff, the fandriver retries to start. Typically, the ratio Ton/Toff is typically between ⅕ and 1/10 or 1/20. Failure diagnostics information may be embedded using timings toffdiag1, toffdiag2, etc., to indicate the different failure modes. Example failure modes can be over temperature in the integrated circuit, overvoltage on the power supply (VDD), undervoltage on the power supply (VDD), short circuit inside the motor, etc. By adding the additional current during the Toff time, current pulses above the high threshold may be generated. Additional information may be embedded in the amplitude and the timing of these pulses. This is also illustrated in FIG. 9. Current pulses ILRP drawn by the motor during failing start up attempts are shown. It can be seen that the period between the startup attempts is modulated. When the motor is rotating, the monitored current equals the sum of the driving current (Ioperation) and the additional current (IRD).

In embodiments of the present invention diagnostics may be shared while the BLDC motor is still running, by modulating current on top of the existing motor current. In such systems the BLDC motor controller may be adapted for considering at least a third threshold. This third threshold may for example be selected such that it is higher than the maximum operating current of the BLDC motor, and the BLDC motor controller may be adapted for generating the additional current for the diagnostics such that it is higher than the monitored current under all operating conditions.

Figure 10:
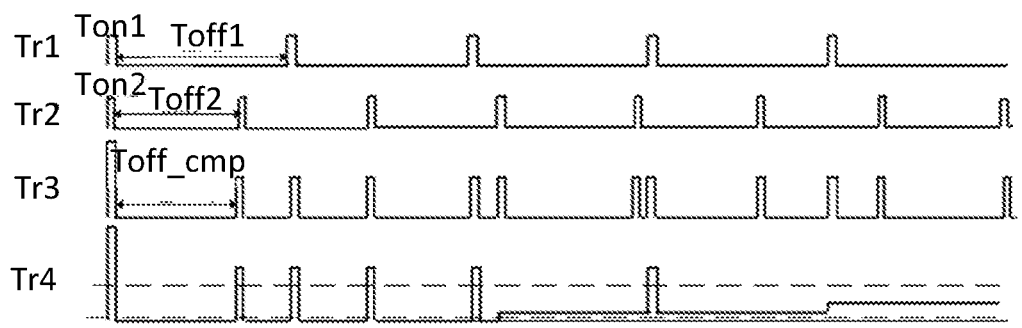
FIG. 10 and FIG. 11 show the monitored current obtained using a BLDC motor controller which is adapted for modulating the monitored current to embed additional information in the monitored current.
Figure 11:
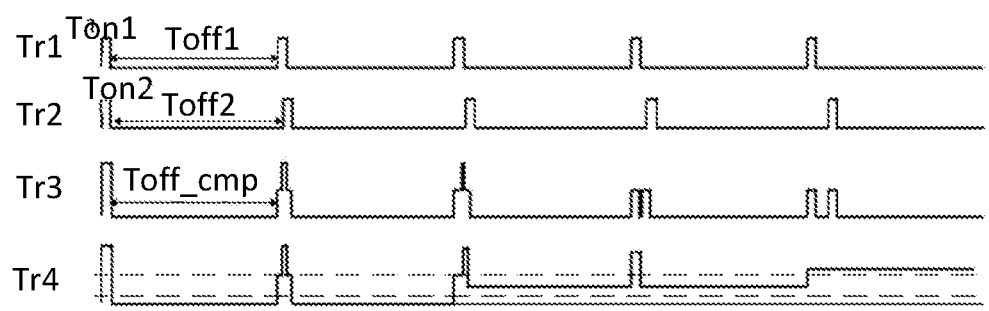

FIG. 10 and FIG. 11 show the monitored current obtained using a BLDC motor controller 100 which is adapted for modulating the monitored current to embed additional information in the monitored current. The monitored current of a motor of a first fan and the monitored current of a motor of a second fan, as well as the sum of both currents is shown.

The first Tr1 and second trace Tr2 in FIG. 10 and FIG. 11 show current pulses of the first, respectively second motor in LRP. The third trace Tr3 shows the total monitored current of the first motor and the second motor. The fourth trace Tr4 shows the total monitored current of both motors and this in LRP as well as in rotating mode. This trace shows the current pulses superimposed on top of the operational motor current.

As can be seen from FIG. 10 and FIG. 11 a BLDC motor controller in accordance with embodiments of the present invention allows to have 2 motors on the same supply line and to distinguish the state between each individual motor.

In FIG. 10 and FIG. 11 the motors are asynchronous. Different superpositions may exist for the current. In FIG. 10 these superpositions do not reach the high threshold, while in FIG. 11 they reach the high threshold after the last sequence of restart pulses.

In a third aspect embodiments of the present invention relate to a method for controlling a BLDC motor. The method comprises:
  applying a first voltage on a first terminal and a second voltage on a second terminal to obtain a driving current for driving the BLDC motor wherein the first voltage is higher than the second voltage,
  monitoring a signal which is indicative for a current through at least the first or the second terminal,
  increasing the monitored current by applying an additional current,
  determining whether the motor is rotating or not based on the monitored signal.

In embodiments of the present invention it may be that the additional current is not driving the BLDC motor.

In embodiments of the present invention the additional current may be different from zero.

In embodiments of the present invention the additional current may be smaller when the motor is not rotating the when the motor is rotating.

In embodiments of the present invention the additional current may be defined by using an output signal which is indicative for a motion state of the motor. This may for example be a frequency generator signal or a motor ready signal.

In embodiments of the present invention the additional current should for example be larger than 1% of the nominal current of the motor, or even larger than 5%, or even larger than 10%, or even larger than 20%, or even larger than 50%, or even larger than 75% of the nominal current of the motor.

In an exemplary embodiment of the present invention the additional current may for example be above 5 mA, or even above 10 mA, or even above 20 mA, for example up to 30 mA. The supply voltage may for example be 9V.

The invention claimed is:

1. A Brushless Direct Current (BLDC) motor controller for controlling a BLDC motor, the BLDC motor controller comprising a first and a second terminal for applying a first voltage on the first terminal and a second voltage on the second terminal to obtain a driving current for driving the BLDC motor wherein the first voltage is higher than the second voltage,
  the BLDC motor controller comprising a remote control unit which is adapted for monitoring a signal which is indicative for a current through at least the first or the second terminal,
  the BLDC motor controller being adapted for increasing the monitored current by applying an additional current, wherein the additional current is not driving the BLDC motor, and wherein the additional current is different from zero if the motor is rotating,
  the BLDC motor controller being adapted for determining whether the motor is rotating or not based on the monitored signal.

2. The BLDC motor controller according to claim 1, the BLDC motor controller comprising a current module adapted for applying the additional current using an output pin of the BLDC motor of which an output signal is indicative for a motion state of the motor wherein the motion state indicates whether the motor is rotating or not.

3. The BLDC motor controller according to claim 2, wherein the current module comprises at least one pull up resistor connected between the first terminal and the output pin which is adapted for generating a frequency generator signal or a motor ready signal.

4. The BLDC motor controller according to claim 2, wherein the current module comprises at least one transistor of which a gate or base is adapted to be connected to the output pin, which is adapted for generating a frequency generator signal or a motor ready signal, and wherein a source/drain or emitter/collector current path of the transistor is connected between the first terminal and the second terminal.

5. The BLDC motor controller according to claim 1, the BLDC motor controller comprising a current module adapted for monitoring the driving current and for applying the additional current in function of the driving current such that with an increased driving current an increased additional current is applied.

6. The BLDC motor controller according to claim 1, the motor controller being adapted for modulating the monitored current to embed additional information in the monitored current.

7. The BLDC motor controller according to claim 1, the BLDC motor controller comprising a switch adapted for disconnecting a current module.

8. A motor system comprising a BLDC motor controller according to claim 1, and a BLDC motor.

9. The motor system according to claim 8, the BLDC motor comprising an output pin connected with a current module, wherein the output pin is adapted to generate an output signal which is indicative for a motion state of the motor, wherein the motion state indicates whether the motor is rotating or not;
  wherein the additional current is not driving the BLDC motor.

10. The motor system according to claim 9, wherein the BLDC motor is adapted for generating a motor ready signal on the output pin.

11. The motor system according to claim 10, wherein the BLDC motor is adapted for starting the ready signal during a driven period with an initial state which indicates a rotating motor.

12. The motor system according to claim 10, wherein the BLDC motor is adapted for starting the ready signal during a driven period with an initial state which indicates a non-rotating motor.

13. The motor system according to claim 9, wherein the BLDC motor is adapted for generating a frequency generator signal on the output pin.

14. A method for controlling a BLDC motor, the method comprising:
- applying a first voltage on a first terminal and a second voltage on a second terminal to obtain a driving current for driving the BLDC motor wherein the first voltage is higher than the second voltage;
- monitoring a signal which is indicative for a current through at least the first or the second terminal;
- increasing the monitored current by applying an additional current, wherein the additional current is not driving the BLDC motor; and
- determining whether the motor is rotating or not based on the monitored signal.

\* \* \* \* \*